(12) United States Patent
Rahm et al.

(10) Patent No.: US 12,370,898 B2
(45) Date of Patent: Jul. 29, 2025

(54) ELECTRIC ENERGY DISSIPATING SYSTEM FOR A VEHICLE

(71) Applicant: VOLVO TRUCK CORPORATION, Gothenburg (SE)

(72) Inventors: Fredrik Rahm, Hörby (SE); Johan Lindberg, Gothenburg (SE); Peter Tennevall, Malmö (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 199 days.

(21) Appl. No.: 18/361,295

(22) Filed: Jul. 28, 2023

(65) Prior Publication Data

US 2024/0059153 A1    Feb. 22, 2024

(30) Foreign Application Priority Data

Aug. 16, 2022   (EP) .................................. 22190537

(51) Int. Cl.
*B60L 7/22*   (2006.01)
*B60L 3/00*   (2019.01)

(52) U.S. Cl.
CPC .............. *B60L 7/22* (2013.01); *B60L 3/0076* (2013.01); *B60L 2200/36* (2013.01)

(58) Field of Classification Search
CPC ....... B60L 7/22; B60L 3/0076; B60L 2200/36
See application file for complete search history.

(56) References Cited

U.S. PATENT DOCUMENTS 4,093,900 A    6/1978 Plunkett
7,633,271 B2   12/2009 Schulte et al.
(Continued)

FOREIGN PATENT DOCUMENTS

EP    3569440 A2   11/2019
RU    2706865 C1   11/2019
(Continued)

OTHER PUBLICATIONS

Communication pursuant to Article 94(3) EPC dated Nov. 21, 2024 in corresponding European Patent Application No. 22190537.5, 6 pages.
(Continued)

*Primary Examiner* — Zoheb S Imtiaz
(74) *Attorney, Agent, or Firm* — Venable LLP; Jeffri A. Kaminski

(57) ABSTRACT

An electric energy dissipating system for a vehicle. An air flow producing unit provides a pressurized air flow through a fluid conduit. A polyphase electric machine runs on a predefined number of phases. The air flow producing unit is mechanically connected to, and operated by, the electric machine. An electric brake resistor arrangement is located downstream of the air flow producing unit, and comprises one resistor unit for each one of said phases. An electric power system is configured to receive electric power generated by an electric traction motor during braking of the vehicle. The power system comprises an inverter which converts a DC input into a polyphase AC output. The electric machine and the resistor arrangement are electrically connected to the inverter in parallel, such that each phase of the AC output of the inverter is connected to a respective phase of the electric machine and to a respective resistor unit, in parallel.

11 Claims, 4 Drawing Sheets

(56) References Cited

U.S. PATENT DOCUMENTS

| | | | |
|---|---|---|---|
| 9,731,607 B1 | 8/2017 | Ratadiya et al. | |
| 2004/0222761 A1 | 11/2004 | Jockel | |
| 2005/0241865 A1 | 11/2005 | Varenne | |
| 2018/0111496 A1* | 4/2018 | Cholewa | B60L 58/13 |
| 2020/0223459 A1* | 7/2020 | Wolff | H02K 9/00 |

FOREIGN PATENT DOCUMENTS

| | | | |
|---|---|---|---|
| WO | 12128770 A1 | 9/2012 | |
| WO | 2013152429 A1 | 10/2013 | |

OTHER PUBLICATIONS

Extended European Search Report in corresponding European Application No. 22190537.5 dated Feb. 6, 2023 (9 pages).

* cited by examiner

ELECTRIC ENERGY DISSIPATING SYSTEM FOR A VEHICLE

TECHNICAL FIELD

The present disclosure relates to an electric energy dissipating system for a vehicle. The present disclosure also relates to a vehicle comprising such an electric energy dissipating system.

The teachings of the present disclosure can be applied in heavy-duty vehicles, such as trucks, buses and construction equipment. Although the disclosure will mainly focus on a truck using a fuel cell or battery for providing electric power to an electric traction motor, the teachings herein are not restricted to such a truck, but may also be used in other vehicles that are at least partially propelled by an electric traction motor.

BACKGROUND

The propulsion systems of vehicles are continuously developed to meet the demands from the market. A particular aspect relates to the emission of environmentally harmful exhaust gas. Therefore, vehicles propelled by electric machines and/or electric machine receiving electric power form hydrogen fuel cells have grown in popularity, in particular for trucks and other heavy-duty vehicles.

In comparison to a vehicle propelled solely by an internal combustion engine (ICE), a vehicle propelled by an electric machine conventionally struggles with obtaining the desired functionality of auxiliary braking. For an ICE operated vehicle, the auxiliary braking can be achieved by means of a retarder, etc. However, for an electric vehicle, the auxiliary braking functionality can be a dimensioning factor for the cooling system since the cooling capacity of, for instance, a fuel cell electric vehicle (FCEV) as well as battery electric vehicle (BEV) is a limiting factor. The reason is that for such type of vehicles, the auxiliary braking places a lot of energy in the cooling system.

It is therefore desirable to provide a solution which puts less strain to the vehicle cooling system.

SUMMARY

An object of the present disclosure is to at least partly overcome the above mentioned deficiencies. This and other objects, which will become apparent in the following discussion, are accomplished by the electric energy dissipating system of the accompanying independent claim. Some exemplary non-limiting embodiments are presented in the dependent claims.

The inventors have realized that electric energy may be effectively dissipated by using an electric brake resistor arrangement located in a fluid conduit downstream of an air flow producing unit. More specifically, the inventors have realized that by connecting the electric brake resistor arrangement and an electric machine that operates the air flow producing unit to a common inverter, a satisfactory dissipation of electric energy may be achieved in a cost-effective and space-saving manner. This will now be discussed in more detail in the following.

According to a first aspect of the present disclosure, there is provided an electric energy dissipating system for a vehicle, the system comprising:

a fluid conduit, an air flow producing unit configured to provide a pressurized air flow through said fluid conduit, a polyphase electric machine configured to run on a predefined number of phases, wherein the air flow producing unit is mechanically connected to, and operated by, the polyphase electric machine, an electric brake resistor arrangement located in said fluid conduit downstream of the air flow producing unit, the electric brake resistor arrangement comprising one resistor unit for each one of said predefined number of phases, an electric power system configured to be electrically connected to an electric traction motor of the vehicle and configured to receive electric power generated by the electric traction motor during braking, wherein the electric power system comprises an inverter which converts a DC input into a polyphase AC output, wherein the polyphase electric machine and the electric brake resistor arrangement are electrically connected to the inverter in parallel, such that each phase of the AC output of the inverter is connected to a respective phase of the polyphase electric machine and to a respective resistor unit, in parallel.

By connecting each phase of the AC output of the inverter to a respective phase of the polyphase electric machine and to a respective resistor unit of the electric brake resistor arrangement (in parallel), a relatively small and cost effective solution for good dissipation of electric energy is achieved. In particular, the use of a common inverter for the polyphase electric machine and the electric brake resistor arrangement is advantageous compared to having separate invertors. High voltage DC systems having inverters normally require expensive components. To reduce the number of AC outputs from two to one provides a considerable cost reduction as well as space saving.

The electric brake resistor arrangement may thus heat air supplied from the air flow producing unit by electrical power received from the electric power system via the inverter. The heated air may then be passed/exhausted to the ambient environment.

The electric power system which comprises the inverter may also comprise other components, such as a battery for storing regenerated electric energy, a junction box, a traction inverter for inverting regenerated electric energy from AC to DC, etc.

As explained above, the electric brake resistor arrangement comprises one resistor unit for each one of the predefined number of phases of the polyphase electric machine. For instance, if the electric machine runs on three phases, the number of resistor units is three, and if the electric machine runs on six phases, the number of resistor units is six. In its turn each resistor unit may comprise a single electric brake resistor, or a plurality of such resistors. In case an individual resistor unit comprises two or more resistors, those resistors may be arranged in series or in parallel with each other depending on the desired properties of the individual resistor unit. It should also be understood that the electric brake resistor arrangement may comprise additional components, such as for example a heat exchanger, e.g. a heat exchanger forming a liquid cooled resistor. Such a heat exchanger may be positioned either upstream or downstream of the resistor units as seen in the flow direction from the air flow producing unit, and/or such a heat exchanger may be integrated in one or more of the resistor units. The electric brake resistor arrangement may also comprise other components such as e.g. turbulators and/or flow directors, etc. Furthermore, the electric brake resistor arrangement may be integrally formed with an air flow restriction arrangement and/or a muffler. Various electric brake resistor arrangements are thus conceivable.

The air flow producing unit should be construed as a unit arranged to receive air and blow the air towards the electric brake resistor arrangement. The air flow producing unit may, for example, be a fan arranged to receive air which is blown towards the electric brake resistor arrangement. According to at least one exemplary embodiment, the air flow producing unit may be or comprise an air compressor configured to compress the received air and transmit the compressed air to the electric brake resistor arrangement.

From the above, it should be understood that the present electric energy dissipating system may thus advantageously "burn off" electric energy for performing a braking operation of the vehicle, whereby the electric energy gained during such an event is placed into a raised temperature of air in the electric brake resistor arrangement. The teachings of the present disclosure are particularly advantageous when for example a vehicle battery is full and the cooling system has reached its limit, i.e. the cooling system is unable to provide any cooling. A further advantage is thus existing cooling systems may be downsized.

Furthermore, in the above mentioned embodiment of using an air compressor as the flow producing unit, the air compressor may also receive electric energy which is placed into an increased pressure of the air, as well as an increased temperature level of the air.

Furthermore, the air compressor may provide air at a suitable high pressure level that may reduce the packaging size of the electric brake resistor arrangement, since heat transfer between the air intake and the electric brake resistor arrangement is increased. Also, heat transfer will be increased with higher resistor pressure level that results in higher air velocity. In addition, the specific heat transfer coefficient will increase with an increased temperature level. An air compressor can also be provided as a relatively small component fulfilling the desires of creating sufficient increase in pressure and mass flows. An air compressor is also consuming relatively high level of power when compressing the air, thus improving the energy dissipation.

According to at least one exemplary embodiment, the electric energy dissipating system comprises a control unit which is configured to:
  receive a brake request signal, and
  based on the brake request signal, activate the inverter so as to provide power to at least one of the polyphase electric machine and the electric brake resistor arrangement.

This may be advantageous as, for instance, depending on the requested magnitude of the braking action, it may suffice to dissipate energy to one of the devices. In particular, if the vehicle is currently driven through an area where disposal of hot air from the vehicle or largely raised temperature of the electric brake resistor arrangement should be avoided (e.g. for safety reasons), the control unit may suitably perform a control action so that only the polyphase electric machine is energized, while the electric brake resistor arrangement is electrically disconnected from the inverter.

According to at least one exemplary embodiment, the control unit is configured to:
  receive input data,
  based on the received input data, determine if only the polyphase electric machine is to be powered from the inverter or if the electric brake resistor arrangement is also to be powered from the inverter, and
  when the control unit determines that only the polyphase electric machine is to be powered from the inverter, then the control unit is configured to electrically disconnect each resistor unit from the respective phase of the AC output of the inverter at a zero-crossing of said respective phase.

As mentioned previously, disconnecting the electric brake resistor arrangement may be advantageous, in certain circumstances or environments. For instance, if said input data includes a geographical location which near a flammable facility, it may be desirable to reduce the temperature of the resistors. As a purely illustrative example, when the electric brake resistor arrangement is disconnected the air heated by the air flow producing unit (e.g. a compressor) may be around 130° C., whereas when the electric brake resistor arrangement is electrically powered the temperature of the air may be raised to 300° C. Other examples of input data may be vehicle speed in combination with geographical data (e.g. below 50 km/h in a city). Another example of input data may be a size of a brake torque request from the electric power system.

According to at least one exemplary embodiment, the electric brake resistor arrangement comprises a plurality of contactors, one for each phase, enabling the resistor units to be electrically disconnected from the AC output of the inverter, wherein the control unit is configured to control the respective contactor when disconnecting the resistor units from the respective phase of the AC output of the inverter.

Another possibility is to let the control unit control the contactors to disconnect the vehicle when the polyphase electric machine is not rotating. This may be advantageous in predictive control scenarios, in which the control unit may predict how much energy will be dissipated later, and may in advance disconnect or re-connect the resistor units in anticipation of such a dissipation even/brake event.

According to at least one exemplary embodiment, when the electric energy dissipating system is in a state in which the inverter only provides power to the polyphase electric machine and the electric brake resistor arrangement is electrically disconnected from inverter, and the control unit determines that the electric brake resistor arrangement should also be engaged in the energy dissipation, then the control unit is configured to:
  temporarily deactivate the inverter so that no power is provided to the polyphase electric machine,
  re-connect the resistor units to the respective phases of the AC outputs of the inverter, and
  re-activate the inverter so that it provides power to both the polyphase electric machine and the electric brake resistor arrangement.

The re-connection of the resistor units is suitably synchronized to the zero voltage crossing for each phase respectively in order to avoid an electric flash. This also saves the contactors and enables the use of less costly/advanced contactors. It should be noted that the phases are distributed over one electric machine revolution, so for a three-phase electric machine the three phases are separated 120° of the electric machine revolution (evenly).

According to at least one exemplary embodiment, the control unit is connected to the electric power system and the polyphase electric machine, wherein the control unit is configured to:
  receive a signal indicative of a current energy dissipation request from the electric power system, and when the electric power system requests dissipation of energy the control unit is configured to:

activate the inverter to provide power to at least one of the polyphase electric machine and the electric brake resistor arrangement.

Thus, the control unit may thus advantageously control the operation of the electric power system in order to energize the polyphase electric machine when the control unit has been notified of a request to dissipate energy from the electric power system.

According to at least one exemplary embodiment, the current energy dissipation request is based on a desired energy level of the electric power system at an upcoming driving position for the vehicle, wherein before the vehicle arrives at the upcoming driving position, the control unit is configured to:
- control the polyphase electric machine to propel the air flow producing unit for producing a flow of air to the electric brake resistor arrangement, and
- control the electric power system to supply electric power to the electric brake resistor arrangement for heating the air received by the electric brake resistor arrangement.

Thus, based on the upcoming driving position, such as an upcoming driving situation, based on e.g. speed limits, altitude, etc., the control unit may determine the level of energy that will be obtained by the electric power system at the upcoming driving position. Hereby, energy dissipation may be made before the vehicle arrives at the upcoming driving position and the electric power system is thus able to receive electric power when the vehicle arrives at said upcoming driving position. The power dissipation is thus made in advance to enable for example a battery of the electric power system to receive electric power.

According to at least one exemplary embodiment, the control unit is further configured to:
- determine, based on the current energy dissipation request, an amount of energy to dissipate,
- determine a first maximum operational power level of the air flow producing unit,
- determine a second maximum operational power level of the electric brake resistor arrangement, and
- control the electric machine and the electric brake resistor arrangement to dissipate the determined amount of energy without exceeding the first and second maximum operational power levels.

Hereby, it is possible to avoid the risk of either one of the air flow producing unit and the electric brake resistor arrangement exceeding its maximum operational level, thereby increasing their operational lifetime. Also, an accurate operational control may hereby be performed where the air flow producing unit as well as the electric brake resistor arrangement can be controlled to operate within a predetermined operational range, respectively. The predetermined operational range may thus be the operational range for the respective component at which they are most efficient.

According to at least one exemplary embodiment, the electric brake resistor arrangement comprises a plurality of inductor elements, each one of said resistor units being electrically connected in series with a respective one of said plurality of inductor elements. This is advantageous as it avoids voltage peaks and thus avoids the risk of damaging the electric brake resistor arrangement. The inductor elements may, for instance, be in the form of coils or transformers.

According to at least one exemplary embodiment, each phase of the AC output of the inverter has a common outlet for connecting to both the polyphase electric machine and to the electric brake resistor arrangement.

This provides a simple connection solution of the AC output of the inverter, and may also be space-saving. Furthermore, the cost may be reduced (fewer parts), and control actions may be simplified.

According to at least one exemplary embodiment, each phase of the AC output of the inverter has one outlet for connecting to the polyphase electric machine and another outlet for connecting to the electric brake resistor arrangement.

This is advantageous as it enables a more individual control of the two connected devices, allowing individual electrical connecting/disconnecting to the inverter.

According to at least one exemplary embodiment, upon activation of the system after standstill, suitably, only the air flow producing unit is driven, or both the air flow producing unit and the electric brake resistor arrangement are driven at low power for a period of time if the control unit indicates this to be desirable due to risk of moisture in the resistor arrangement. This will then dry out the system, reducing the relative moisture to a safe level.

According to a second aspect of the present disclosure, there is provided a vehicle in the form of a battery electric vehicle (BEV) or a fuel cell electric vehicle (FCEV), the vehicle comprising the electric energy dissipating system according to the first aspect, including any exemplary embodiment thereof.

The advantages of the vehicle of the second aspect are largely analogous to the advantages of the electric energy dissipating system of the first aspect, including any exemplary embodiment thereof.

The herein described control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

Generally, all terms used in the claims are to be interpreted according to their ordinary meaning in the technical field, unless explicitly defined otherwise herein. All references to "a/an/the part, element, apparatus, component, arrangement, device, means, step, etc." are to be interpreted openly as referring to at least one instance of the part, element, apparatus, component, arrangement, device, means, step, etc., unless explicitly stated otherwise. Further features of, and advantages with, the present inventive concept will become apparent when studying the appended claims and the following description. The skilled person realizes that different features of the present inventive concept may be combined to create embodiments other than those described in the following, without departing from the scope of the present inventive concept.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
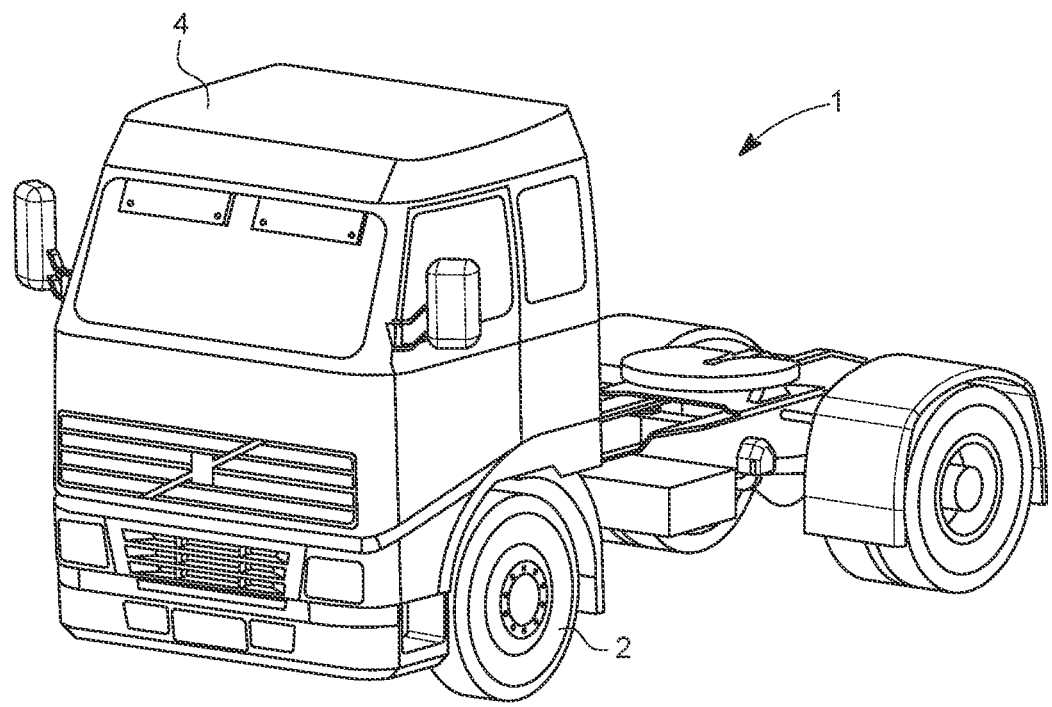
FIG. 1 illustrates a vehicle in which an electric energy dissipating system according to the present disclosure may be implemented.

The general inventive concept will now be described more fully hereinafter with reference to the accompanying drawings, in which certain aspects of the inventive concept are shown. The inventive concept may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the general inventive concept is not limited to the embodiments described herein and illustrated in the drawings; rather, the skilled person will recognize that many changes and modifications may be made within the scope of the appended claims. Like reference numerals refer to like elements throughout the description.

FIG. 1 illustrates a vehicle 1 in which an electric energy dissipating system according to the present disclosure may be implemented. In this example, the vehicle 1 is a heavy-duty vehicle in the form of a tractor unit. The tractor unit may be powered by a fuel cell system. The vehicle 1 may thus be a fuel cell electric vehicle (FCEV). Alternatively, the tractor unit may be powered by an electric battery, i.e. the vehicle 1 may thus be a battery electric vehicle (BEV). The vehicle 1 comprises an electric traction motor (not illustrated) for propelling the road wheels 2 of the vehicle 1. The electric traction motor may thus receive electric power from a traction battery (in case of a BEV) or directly from a fuel cell system (in case of an FCEV). An electric power system of the electric energy dissipating system may thus be connected to the electric traction motor. Although a tractor unit has been illustrated, it should be understood that the teachings of the present disclosure may also be implemented in other types of vehicles, such as busses, construction equipment and passenger cars. The illustrated vehicle 1 comprises a cabin 4 in which a driver may operate the vehicle 1. However, in other exemplary embodiments the vehicle 1 may be an autonomous, i.e. self-driving, vehicle.

Figure 2:
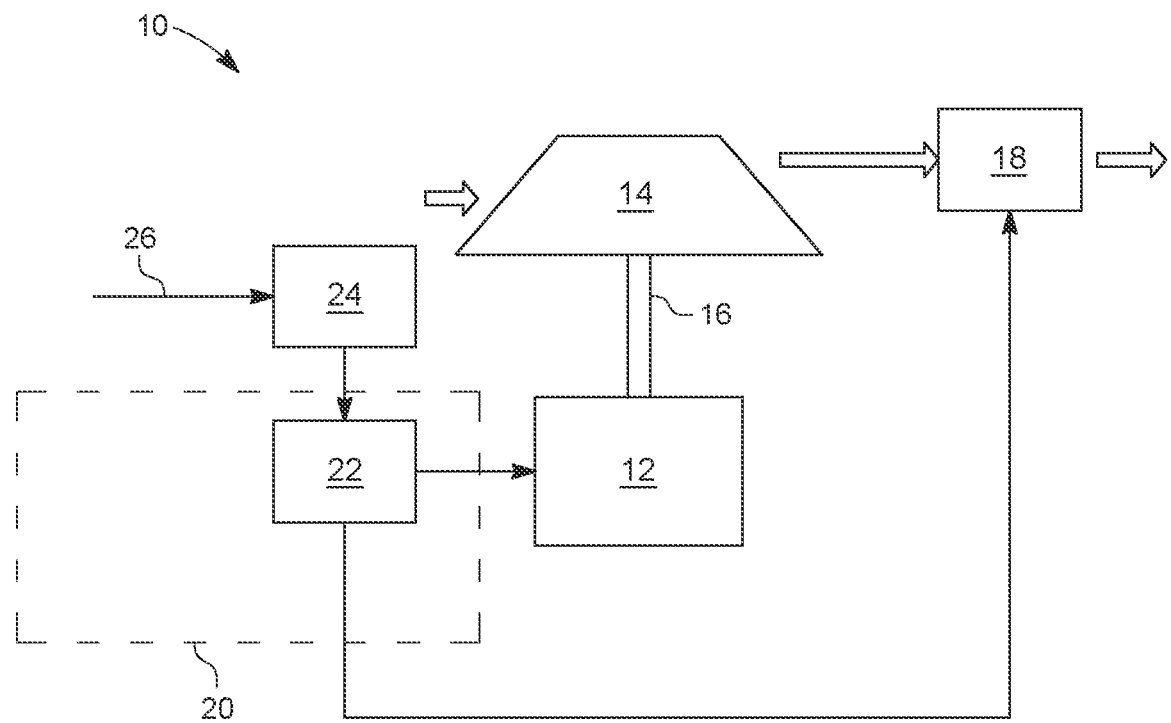
FIG. 2 is a schematic illustration of an electric energy dissipation system according to at least one exemplary embodiment of the present disclosure.

FIG. 2 is a schematic illustration of an electric energy dissipation system 10 according to at least one exemplary embodiment of the present disclosure. The illustrated electric energy dissipation system 10 may, for instance, be provided in a vehicle such as the one illustrated in FIG. 1. The electric energy dissipation system 10 illustrated in FIG. 2 comprises a polyphase electric machine 12 which runs on a predefined number of phases, for instance three phases. The polyphase electric machine 12 is mechanically connected to and configured to operate an air flow producing unit 14. The air flow producing unit 14, here illustrated as an air compressor, is configured to provide a pressurized air flow through a fluid conduit (not illustrated). The air flow is illustrated by block arrows into and out of the air flow producing unit 14. The mechanical connection between the polyphase electric machine 12 and the air flow producing unit 14 may suitably be provided by means of a shaft 16.

An electric brake resistor arrangement 18 is located in the fluid conduit downstream of the air flow producing unit 14. In other words the air flows in a direction from the air flow producing unit 14 towards the electric brake resistor arrangement 18. As will be discussed in more detail in connection with FIGS. 4 and 5, the electric brake resistor arrangement 18 comprises one resistor unit for each one of the phases of the polyphase electric machine 12. Thus, in the above example of a three phase electric machine 12, the electric brake resistor arrangement 18 will have three resistor units. When powered, the electric brake resistor arrangement 18 may heat air received from the air flow producing unit 14. The heated air may thereafter be provided to the ambient environment.

As further illustrated in FIG. 2, the electric energy dissipating system 10 comprises an electric power system 20. The electric power system 20 is configured to be electrically connected to an electric traction motor (not shown) of the vehicle and configured to receive electric power generated by the electric traction motor during braking. The electric power system 20 may be configured to convert an incoming alternating current from the electric traction motor into a direct current. The regenerative electric energy received through such braking may, for instance, be stored in a battery of the electric power system, assuming the present state of charge and capacity of the battery allow such storage. The electric power system 20 may in turn be used for powering the polyphase electric machine 12 in order to dissipate electric energy (for instance, if the battery cannot store more electric energy or needs to lower its state of charge). To this end, the electric power system comprises an inverter 22 which converts a DC input into a polyphase AC output. Furthermore, instead of providing a separate inverter for the electric brake resistor arrangement 18, the same inverter 22 may be connected to the electric brake resistor arrangement 18. Thus, the polyphase electric machine 12 and the electric brake resistor arrangement 18 are connected in parallel with respect to each other to the inverter 22. More specifically, each phase of the AC output of the inverter 22 is connected to a respective phase of the polyphase electric machine 12 as well as to a respective resistor unit, in parallel.

FIG. 2 also illustrates that the electric energy dissipating system 10 may comprise or be operatively connected to a control unit 24. The control unit 24 may be configured to receive a brake request signal 26. Based on the brake request signal 26, the control unit 24 may activate the inverter 22 so as to provide power to at least one of the polyphase electric machine 12 and the electric brake resistor arrangement 18.

Figure 3:
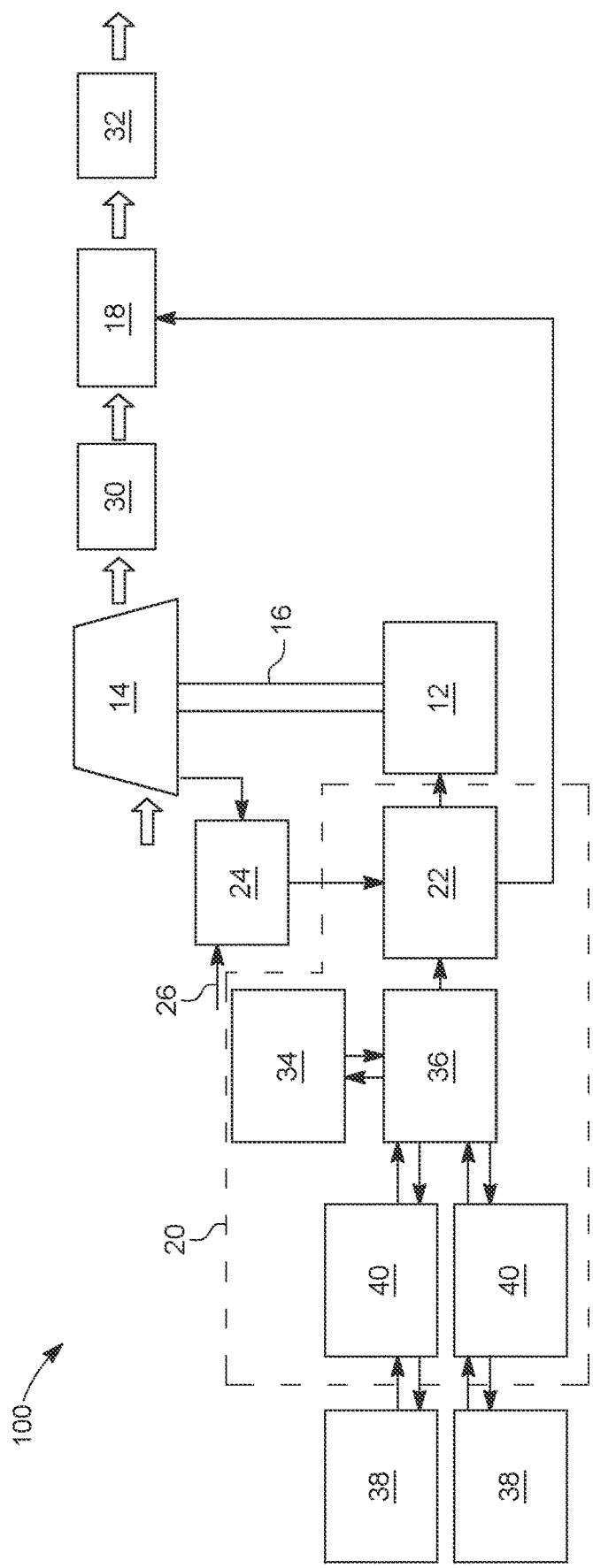
FIG. 3 is a schematic illustration of an electric energy dissipation system according to at least another exemplary embodiment of the present disclosure.

FIG. 3 is a schematic illustration of an electric energy dissipation system 100 according to at least another exemplary embodiment of the present disclosure. FIG. 3 is more detailed compared to FIG. 2 and includes additional components. As illustrated in FIG. 3, the electric energy dissipating system 100 may, in at least some exemplary embodiments, comprise a flow restrictor 30 arranged in the fluid conduit between the air flow producing unit 14 and the electric brake resistor arrangement 18. For instance, when using an air compressor as said air flow producing unit 14, a flow restrictor 30 may be provided to create a higher pressure in the compressor, enabling it to be in a better position in the compressor map. As further illustrated in FIG. 3, in at least some exemplary embodiments, the fluid conduit may be provided with a noise reduction component 32, such as a muffler. The noise reduction component 32 may suitably be provided downstream of the electric brake resistor arrangement 18.

FIG. 3 illustrates that the electric power system may in addition to the inverter 22 comprise several other components. For instance, the electric power system comprises a battery 34 which may store energy generated during braking. The electric power system 20 may also comprise a junction box 36 which is electrically connected to the battery 34 and the inverter 22. As previously explained, the electric power system 20 is configured to be electrically connected to an electric traction motor of the vehicle and configured to receive electric power generated by the electric traction motor during braking. In this exemplary embodiment, the electric power system 20 is connected to two electric traction motors 38. More specifically, the electric power system 20 comprises inverters 40 for converting the AC power generated by the electric traction motors 38 upon regenerative braking, into DC power. These inverters 40 may therefore be referred to as "traction inverters", while the inverter 22 between the junction box 36 and the electric machine 12/resistor arrangement 18 may be referred to as a "brake inverter".

As also illustrated in FIG. 3, the control unit 24 may optionally also be connected to the air flow producing unit 14, for instance in order to measure the power provided to the air flow producing unit 14. The control unit 24 in FIG. 2 and/or FIG. 3 and functional operations thereof will be described in further detail below.

The control unit 24 preferably comprises processing circuitry including a microprocessor, microcontroller, programmable digital signal processor or another programmable device. The processing circuitry may also, or instead, include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry may be at least partly integrated with e.g. a primary vehicle control unit, or other control units of the vehicle, which is/are arranged to detect an upcoming traffic situation, road topography, etc. The information from the primary vehicle control unit can thus be transmitted to the above described control unit 24 for decision making of the control unit 24.

By means of the electric energy dissipating systems 10, 100 depicted in FIGS. 2 and 3, and described above, electric power from the electric power system 20 is dissipated by electrifying the air flow producing unit 14 and the electric brake resistor arrangement 18, whereby the electric power of the air flow producing unit 14 as well as for the electric brake resistor arrangement 18 is used for heating the air. The electric power is thus dissipated into the air which is released to the ambient environment. Furthermore, the air flow producing unit 14, when in the form of a compressor, will pressurize the air. Part of the electric power is dissipated by the pressurizing and also thereby creating a flow through the system (10, 100).

By means of the control unit 24 depicted in FIGS. 2 and 3, the electric energy dissipating system 10, 100 may be operated in a number of manners for dissipating electric power into heated air which is released into the ambient environment. As mentioned above, the control unit 24 may act based on a received brake request signal 26. Another example is that the control unit 24 may be arranged to receive a signal indicative of a current energy dissipation request from the electric power system 20. For example, a current energy dissipation request may be based on e.g. the battery 34 (see FIG. 3) having a SOC-level above a maximum predetermined limit, whereby the battery 34 is in need of dissipating energy. For instance, the control unit 24 may receive a signal indicative of an upcoming downhill slope where the vehicle will need to use the battery 34 for braking and energy recuperation. In such case, the battery 34 should preferably have a relatively low SOC-level for being able to receive electric power.

When the electric power system 20 requests dissipation of energy, the control unit 24 may be configured to control the inverter 22 to provide power to the polyphase electric machine 12 to energize the air flow producing unit 14 for providing a pressurized air flow to the electric brake resistor arrangement 18. The control unit 24 may also controls the inverter 22 so that the electric brake resistor arrangement 18 is energized by electric power to further heat the received air. Hereby the electric power system 10,100 reduces its electric power level by heating the air.

It should be noted that energy does not necessarily have to be dissipated by engaging both the polyphase electric machine 12 and the electric brake resistor arrangement 18. For instance, the control unit 24 may be configured to receive input data and based on the input data, determine if only the polyphase electric machine 12 is to be powered from the inverter 22 or if the electric brake resistor arrangement is also to be powered from the inverter 22. When the control unit 24 determines that only the polyphase electric machine 12 is to be powered from the inverter 22, then the control unit 24 may electrically disconnect each resistor unit (of the electric brake resistor arrangement 18) from the respective phase of the AC output of the inverter 22 at a zero-crossing of said respective phase. Such input data could, for instance, be geographical location (for example, a location near a flammable facility), or such input data could be a magnitude of a brake torque request. Other input data may be vehicle speed in combination with geographical data, such as below 50 km/h in a city.

Figure 4:
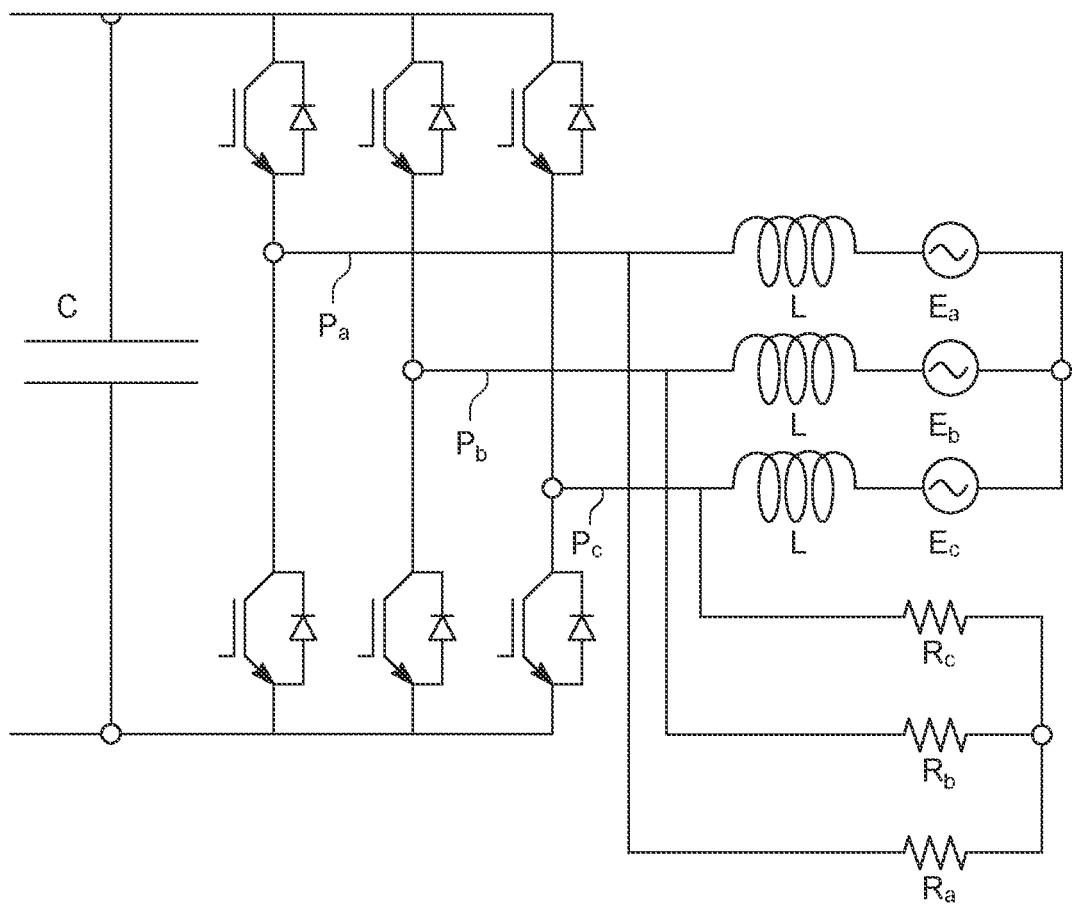
FIG. 4 is an electric diagram illustrating details of the electric energy dissipation system according to at least one exemplary embodiment of the present disclosure.

FIG. 4 is an electric diagram illustrating details of the electric energy dissipation system according to at least one exemplary embodiment of the present disclosure. In particular FIG. 4 illustrates that the polyphase electric machine runs on three phases $E_a$, $E_b$ and $E_c$, electrically connected to a respective phase $P_a$, $P_b$, $P_c$ of the AC output of the inverter. The electric brake resistor arrangement comprises one resistor unit $R_a$, $R_b$, $R_c$ for each one of said phases $E_a$, $E_b$, $E_c$ of the electric machine. As can be seen in FIG. 4, each phase P a, $P_b$, $P_c$ of the AC output of the inverter is connected to a respective phase $E_a$, $E_b$, $E_c$ of the electric machine and to a respective resistor unit $R_a$, $R_b$, $R_c$, in parallel.

Figure 5:
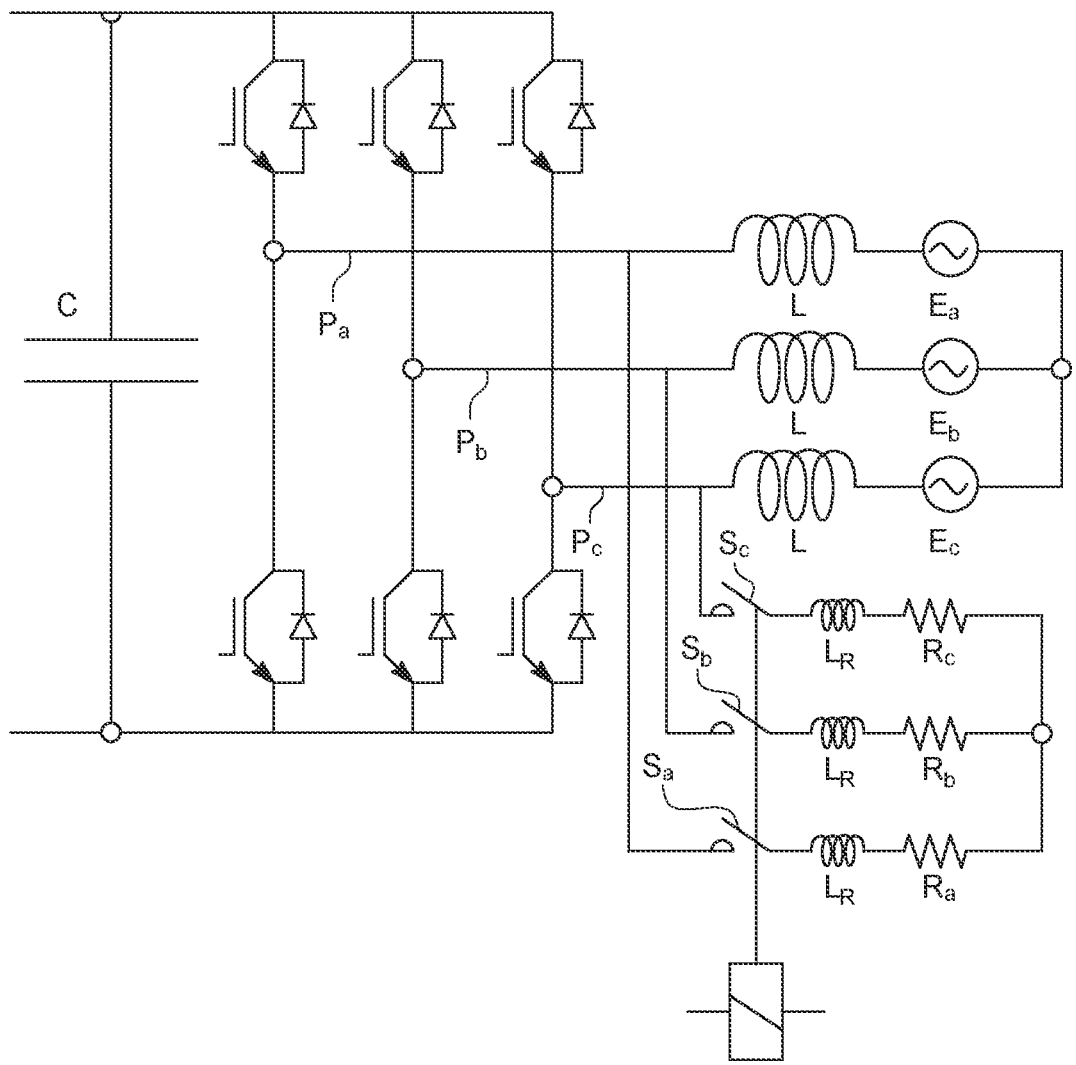
FIG. 5 is an electric diagram illustrating details of the electric energy dissipation system according to at least another exemplary embodiment of the present disclosure.

FIG. 5 is an electric diagram illustrating details of the electric energy dissipation system according to at least another exemplary embodiment of the present disclosure. In addition to the components illustrated FIG. 4, the electric brake resistor arrangement comprises a plurality of contactors $S_a$, $S_b$, $S_c$, one for each phase $P_a$, $P_b$, $P_c$, enabling the resistor units $R_a$, $R_b$, $R_c$ to be electrically disconnected from the AC output of the inverter. The control unit 24 (in e.g. FIG. 2 or 3) may thus be configured to control the respective contactor $S_a$, $S_b$, $S_c$ when disconnecting the resistor units $R_a$, $R_b$, $R_c$ from the respective phase $P_a$, $P_b$, $P_c$ of the AC output of the inverter. The control unit 24, may in at least some exemplary embodiments, suitably disconnect the contactors $S_a$, $S_b$, $S_c$ when the polyphase electric machine 12 is not rotating.

In at least some exemplary embodiments, when the electric energy dissipating system 10 (FIG. 2), 100 (FIG. 3) is in a state in which the inverter 22 only provides power to the polyphase electric machine 12 and the electric brake resistor arrangement 18 is electrically disconnected from inverter 22, and the control unit 24 determines that the electric brake resistor arrangement 18 should also be engaged in the energy dissipation, then the control unit 24 is configured to:

temporarily deactivate the inverter 22 so that no power is provided to the polyphase electric machine 12, re-connect the resistor units $R_a$, $R_b$, $R_c$, to the respective phases $P_a$, $P_b$, $P_c$ of the AC outputs of the inverter 22 (synchronized to the zero voltage crossing for each phase respectively, to avoid an electric flash) thus also saving the contactor $S_a$, $S_b$, $S_c$ (and enabling a less costly/advanced contactor), and re-activate the inverter 22 so that it provides power to both the polyphase electric machine 12 and the electric brake resistor arrangement 18.

As further illustrated in FIG. 5, the electric brake resistor arrangement may comprise a plurality of inductor elements $L_R$, each one of the resistor units $R_a$, $R_b$, $R_c$ being electrically connected in series with a respective one of said inductor elements $L_R$. The provision of the inductor elements L R avoids high voltage initially over the resistor unit $R_a$, $R_b$, $R_c$ and thus avoids the risk of damaging the resistor arrangement (there will initially be high voltage over the inductors, resulting in a low current initially). The inductor elements $L_R$ may, for instance, be in the form of coils or transformers. Suitably, the inductor elements $L_R$ have smaller dimension than other inductor elements L which are serially connected to the phases $E_a$, $E_b$, $E_c$ of the electric machine.

The invention claimed is:

1. An electric energy dissipating system for a vehicle, the system comprising: a fluid conduit, an air flow producing unit configured to provide a pressurized air flow through said fluid conduit, a polyphase electric machine configured to run on a predefined number of phases, wherein the air flow producing unit is mechanically connected to, and operated by, the polyphase electric machine, an electric brake resistor arrangement located in said fluid conduit downstream of the air flow producing unit, the electric brake resistor arrangement comprising one resistor unit for each one of said predefined number of phases, an electric power system configured to be electrically connected to an electric traction motor of the vehicle and configured to receive electric power generated by the electric traction motor during braking, wherein the electric power system comprises an inverter which converts a DC input into a polyphase AC output, wherein the polyphase electric machine and the electric brake resistor arrangement are electrically connected to the inverter in parallel, such that each phase of the AC output of the inverter is connected to a respective phase of the polyphase electric machine and to a respective resistor unit, in parallel; comprising a control unit which is configured to: receive a brake request signal, and based on the brake request signal, activate the inverter so as to provide power to at least one of the polyphase electric machine and the electric brake resistor arrangement; wherein the control unit is configured to: receive input data, based on the input data, determine if only the polyphase electric machine is to be powered from the inverter or if the electric brake resistor arrangement is also to be powered from the inverter, and when the control unit determines that only the polyphase electric machine is to be powered from the inverter, then the control unit is configured to electrically disconnect each resistor unit from the respective phase of the AC output of the inverter at a zero-crossing of said respective phase.

2. The electric energy dissipating system according to claim 1, wherein the electric brake resistor arrangement comprises a plurality of contactors, one for each phase, enabling the resistor units to be electrically disconnected from the AC output of the inverter, wherein the control unit is configured to control the respective contactor when disconnecting the resistor units from the respective phase of the AC output of the inverter.

3. The electric energy dissipating system according to claim 1, wherein when the electric energy dissipating system is in a state in which the inverter only provides power to the polyphase electric machine and the electric brake resistor arrangement is electrically disconnected from inverter, and the control unit determines that the electric brake resistor arrangement should also be engaged in the energy dissipation, then the control unit is configured to: temporarily deactivate the inverter so that no power is provided to the polyphase electric machine, re-connect the resistor units to the respective phases of the AC outputs of the inverter, and re-activate the inverter so that it provides power to both the polyphase electric machine and the electric brake resistor arrangement.

4. The electric energy dissipating system according to claim 1, wherein the control unit is connected to the electric power system and the polyphase electric machine, wherein the control unit is configured to: receive a signal indicative of a current energy dissipation request from the electric power system, and when the electric power system requests dissipation of energy: activate the inverter to provide power to at least one of the polyphase electric machine and the electric brake resistor arrangement.

5. The electric energy dissipating system according to claim 4, wherein the current energy dissipation request is based on a desired energy level of the electric power system at an upcoming driving position for the vehicle, wherein before the vehicle arrives at the upcoming driving position, the control unit is configured to:

control the polyphase electric machine to propel the air flow producing unit for producing a flow of air to the electric brake resistor arrangement, and control the electric power system to supply electric power to the electric brake resistor arrangement for heating the air received by the electric brake resistor arrangement.

6. The electric energy dissipating system according to claim 4, wherein the control unit is further configured to:

determine, based on the current energy dissipation request, an amount of energy to dissipate, determine a first maximum operational power level of the air flow producing unit, determine a second maximum operational power level of the electric brake resistor arrangement, and control the polyphase electric machine and the electric brake resistor arrangement to dissipate the determined amount of energy without exceeding the first and second maximum operational power levels.

7. The electric energy dissipating system according to claim 1, wherein the electric brake resistor arrangement comprises a plurality of inductor elements, each one of said resistor units being electrically connected in series with a respective one of said plurality of inductor elements.

8. The electric energy dissipating system according to claim 1, wherein each phase of the AC output of the inverter has a common outlet for connecting to both the polyphase electric machine and to the electric brake resistor arrangement.

9. The electric energy dissipating system according to claim 1, wherein each phase of the AC output of the inverter has one outlet for connecting to the polyphase electric machine and another outlet for connecting to the electric brake resistor arrangement.

10. The electric energy dissipating system according to claim 1, wherein the air flow producing unit is an air compressor configured to compress the received air and transmit the compressed air to the electric brake resistor arrangement.

11. A vehicle in the form of a battery electric vehicle or a fuel cell electric vehicle, the vehicle comprising the electric energy dissipating system according to claim 1.

* * * * *